UNITED STATES PATENT OFFICE 2,225,258

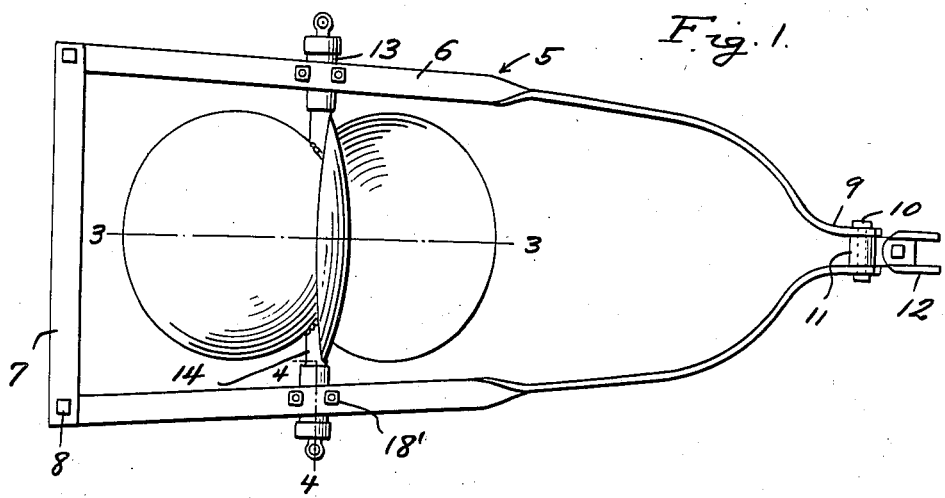

AGRICULTURE IMPLEMENT

Adam P. Dahlman, Power, Mont.

Application January 3, 1940, Serial No. 312,288

1 Claim. (Cl. 97—52)

This invention relates to an agriculture implement operable in connection with various kinds of soil working devices, such as harrows of various types, plows, weeders, etc. and preferably is used in gang formation for the purpose of working the soil in rows to provide therein catch basins in which rain water or snow may accumulate for irrigating purposes and which also will retard soil erosion from wind or rain.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating an agriculture implement constructed in accordance with my invention.

Figure 2 is a side elevation illustrating the same.

Figure 3 is a sectional view taken on the line 3—3 of Figure 1.

Figure 4 is a detail sectional view taken on the line 4—4 of Figure 1.

Referring in detail to the drawing, the numeral 5 indicates a frame including side members 6 and an end member 7. The side members 6 are fastened to the end member, as shown at 8, and adjacent their forward ends are arranged in converging relation and terminate in parallel portions 9 apertured to receive a tie bolt 10 on which is journaled a sleeve 11 forming a part of a pivot type clevis 12 employed for detachably connecting the frame onto a farm implement of some selected kind.

Opposed bearing sleeves 13 are secured on the side members 6 and rotatably support an axle or shaft 14 and secured to said shaft and extending radially therefrom is a plurality of concaved discs 15 which are adapted on the forward movement of the frame to work the soil into catch basins one after the other at a selected distance apart. The purpose of these basins is to permit rain, snow or the like to accumulate therein so as to become absorbed by the soil for irrigation purposes and which also will retard soil erosion by wind and rain.

In mounting the discs 15 on the shaft 14 said discs are grouped radially in abutting engagement and welded to each other, as shown at 17, defining therebetween an axle space to receive the axle 14 which is welded onto each disc, as shown at 18, thereby rigidly mounting the discs on the axle.

The bearing sleeves are secured on the side members 6 of the frame by U bolts 18' and the outer ends of the sleeves are closed by removable caps 19 equipped with lubricating fittings 20.

It is to be understood that as many of the devices of the construction shown in the drawing and described in detail can be hitched to a farming implement, such as a cultivator, plow or the like for the purpose of working the soil into rows of catch basins. In other words, the device as shown is preferably used in gang formation wherein each unit of the gang is separately connected with the towing device and may have upward and downward movements as well as pivotal movement in opposite directions relative to the towing device.

Further the various units making up the gang may be so coupled onto the towing device as to form the basins or hollows in rows wherein the basins or hollows are in staggered relation which has been found to be very beneficial for hilly land or soil as the various basins will not easily empty from one to another in the event of heavy rain and thus store a maximum amount of water for absorption by the soil. Further it will be seen that the discs being mounted on the axle as specified and shown in the drawing will be prevented from clogging and will readily clear themselves as each basin is formed in the soil.

The device herein set forth in detail will form in soil basins or hollows to catch and retain the greatest amount of rain water and snow, so that a gradual seepage thereof into the soil may be had to assure a thorough irrigation of the soil as well as checking soil erosion. The device when drawn behind some other farm implement as before stated, may be swung upwardly on the implement when desiring to render the device inoperative and also if desired the edvice may be constructed as a unit to be used by itself.

It is believed that the foregoing description, when taken in connection with the drawing, will fully set forth the construction and advantages of this invention to those skilled in the art to which such a device relates, so that further detailed description will not be required.

Having thus described my invention, what I claim is:

In an agricultural implement of the class described, spaced side members having portions thereof converging, a clevis connected to the converging portions and said side members for coupling the latter to a towing device for pivotal movement in a lateral direction and in upward and downward directions with respect to said towing device, an end member connecting said side members, an axle journaled on said side members, and a plurality of concaved discs arranged in radial relation to said axle and brought into abutting engagement about said axle and welded to each other and each welded on the axle.

ADAM P. DAHLMAN.